United States Patent
Huang et al.

(10) Patent No.: US 10,123,181 B1
(45) Date of Patent: Nov. 6, 2018

(54) SYSTEMS AND METHODS FOR COLLABORATIVE VEHICLE MISSION OPERATIONS

(71) Applicant: Honeywell International Inc., Morris Plains, NJ (US)

(72) Inventors: Jinming Huang, Beijing (CN); Andrew Graham Ball, Kent (GB); Yufeng Liu, Beijing (CN); Kenneth R. Jongsma, Tijeras, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/585,398

(22) Filed: May 3, 2017

(51) Int. Cl.
| | |
|---|---|
| *H04M 11/04* | (2006.01) |
| *H04W 4/04* | (2009.01) |
| *G08G 1/0968* | (2006.01) |
| *H04W 4/02* | (2018.01) |
| *G08G 1/00* | (2006.01) |
| *H04W 4/22* | (2009.01) |
| *H04W 4/90* | (2018.01) |

(52) U.S. Cl.
CPC ...... *H04W 4/046* (2013.01); *G08G 1/096827* (2013.01); *G08G 1/096883* (2013.01); *G08G 1/202* (2013.01); *H04W 4/023* (2013.01); *H04W 4/22* (2013.01); *H04W 4/90* (2018.02)

(58) Field of Classification Search
CPC ............ H04W 64/00; G08G 1/096827; G08G 1/096883; G08G 1/202; H04M 1/72533
See application file for complete search history.

(56) References Cited

U.S. PATENT DOCUMENTS

| | | |
|---|---|---|
| 7,091,852 B2 | 8/2006 | Mason et al. |
| 7,245,216 B2 | 7/2007 | Burkley et al. |

(Continued)

OTHER PUBLICATIONS

ESA, "Coordinated Support for Mountain Rescues, https://artes-apps.esa.int/projects/showcases/coordinated-support-for-mountain-rescues", "Artes Applications", Jan. 17, 2017, pp. 1-2, Publisher: European Space Agency.

(Continued)

*Primary Examiner* — Steve D Agosta
(74) *Attorney, Agent, or Firm* — Bookoff McAndrews, PLLC

(57) ABSTRACT

Systems and Methods for Collaborative Vehicle Mission Operations are provided. In one embodiment, a method to facilitate collaborative vehicle mission operations comprises: inputting a deployment position and a selected mission category into a mission crew personal computing device; wirelessly communicating the deployment position and the selected mission category to a support vehicle, the support vehicle comprising a mission sensor and a mission computer; receiving the deployment position at a navigation system onboard the vehicle and navigating the vehicle to the deployment position; configuring the operation of the mission sensor and mission computer as defined by a predefined mission profile stored onboard the vehicle; preprocessing sensor measurements from the sensor to extract a subset of data defined as relevant to the mission category based on the predefined mission profile; and transmitting the subset of data defined as relevant to the selected mission category to the mission crew personal computing device.

13 Claims, 4 Drawing Sheets

(56) References Cited

U.S. PATENT DOCUMENTS

| | | | |
|---|---|---|---|
| 7,652,571 | B2 | 1/2010 | Parkulo et al. |
| 7,898,410 | B2 | 3/2011 | Schurter |
| 8,280,405 | B2 | 10/2012 | Sanz-Pastor et al. |
| 8,314,683 | B2 | 11/2012 | Pfeffer |
| 8,606,266 | B1 | 12/2013 | Mitchell |
| 8,755,839 | B2 | 6/2014 | Parkulo et al. |
| 9,522,595 | B2* | 12/2016 | Rudakevych ........ B60K 17/043 |
| 2002/0023788 | A1* | 2/2002 | Torrie ................. B62D 55/065 |
| | | | 180/9.26 |
| 2004/0158355 | A1* | 8/2004 | Holmqvist ........... G05D 1/0236 |
| | | | 700/245 |
| 2004/0217166 | A1* | 11/2004 | Myers ................. G06Q 20/343 |
| | | | 235/383 |
| 2007/0103292 | A1 | 5/2007 | Burkley et al. |
| 2012/0150385 | A1 | 6/2012 | Paquette et al. |
| 2014/0063243 | A1 | 3/2014 | Giuffrida |
| 2014/0081479 | A1 | 3/2014 | Vian et al. |
| 2015/0331421 | A1* | 11/2015 | Brunet ................. G05D 1/0692 |
| | | | 701/23 |
| 2017/0172075 | A1* | 6/2017 | Bermudez Rodriguez ................. |
| | | | A01G 13/065 |

OTHER PUBLICATIONS

Luo, Cai et al, "Air-ground Multi-agent Robot Team Coordination, IEEE International Conference on Robotics and Automation", "ResearchGate", Jun. 1, 2011, pp. 1-5, Publisher: IEEE.

Nato, "Computer Based Decision Support Tool for Helicopter Mission Planning in Disaster Relief and Military Operations", "RTO-TR-SAS-045", Jun. 1, 2008, pp. 1-298, Publisher: RTO/NATO.

Safran Sagem, "Helipsys Helicopter Mission Planning", "Sagem Defense Securite", Jun. 3, 2010, pp. 1-2, Published in: FR.

Safran Electronics and Defense, "Mission Planning Systems", "http://www.safran-electronics-defense.com/aerospace/helicopters/mission-planning-systems", Jan. 17, 2017, pp. 1-2.

Extended European Search Report dated Jun. 28, 2018 in European Application No. 18169683.2 (9 pages).

* cited by examiner

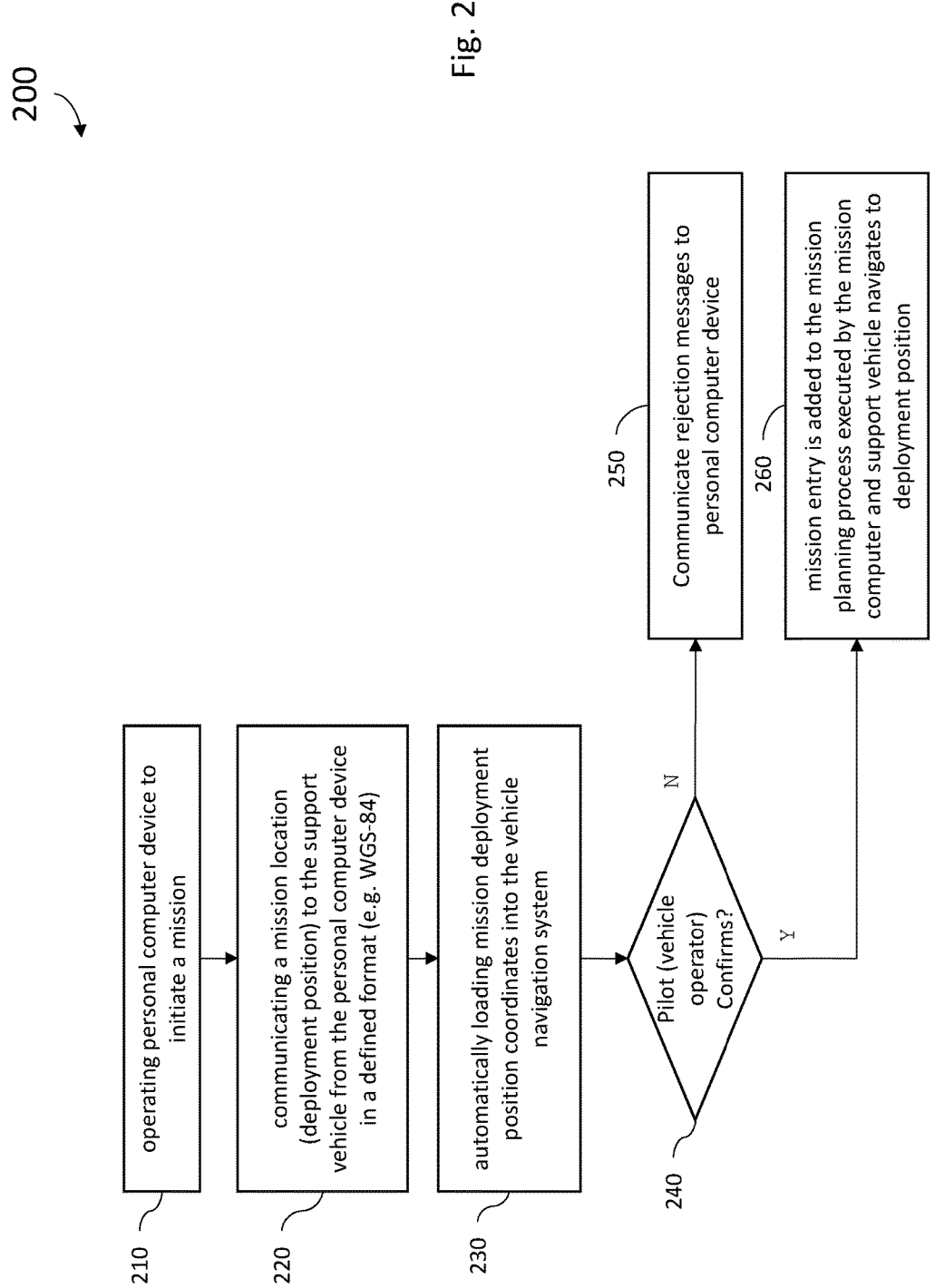

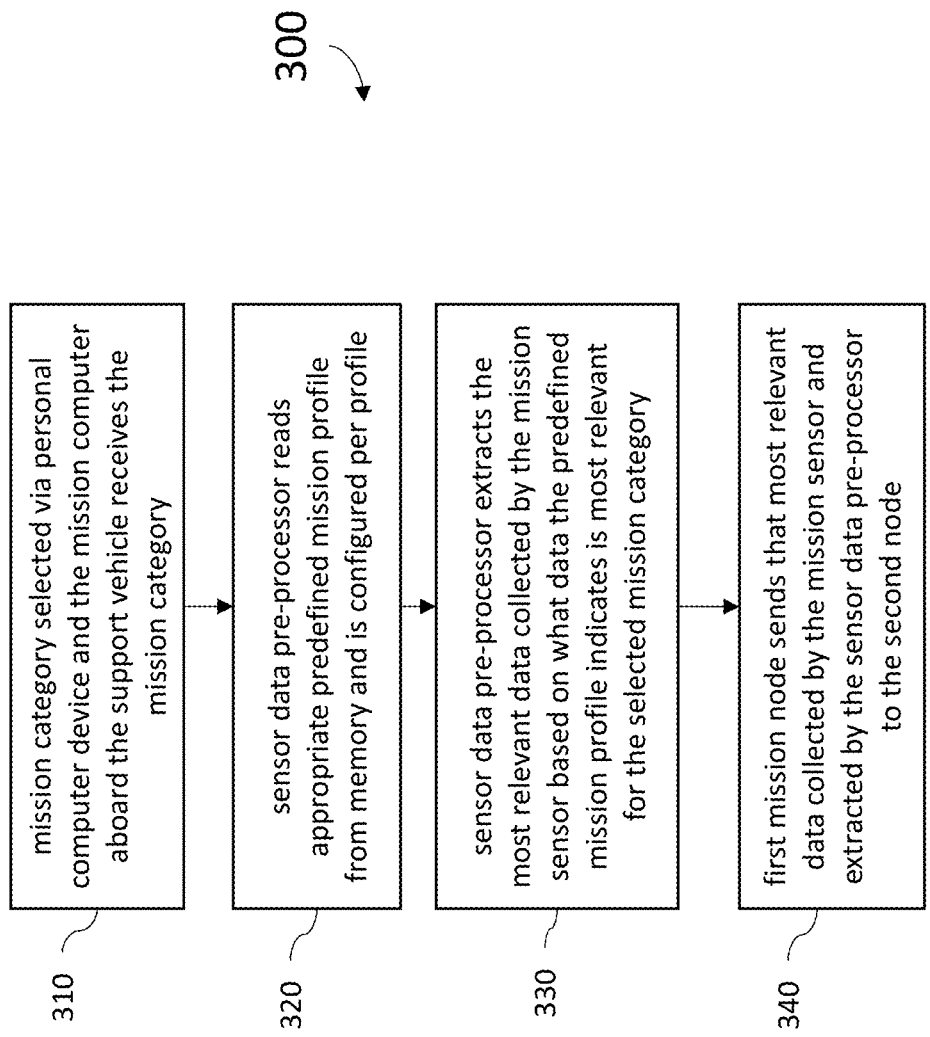

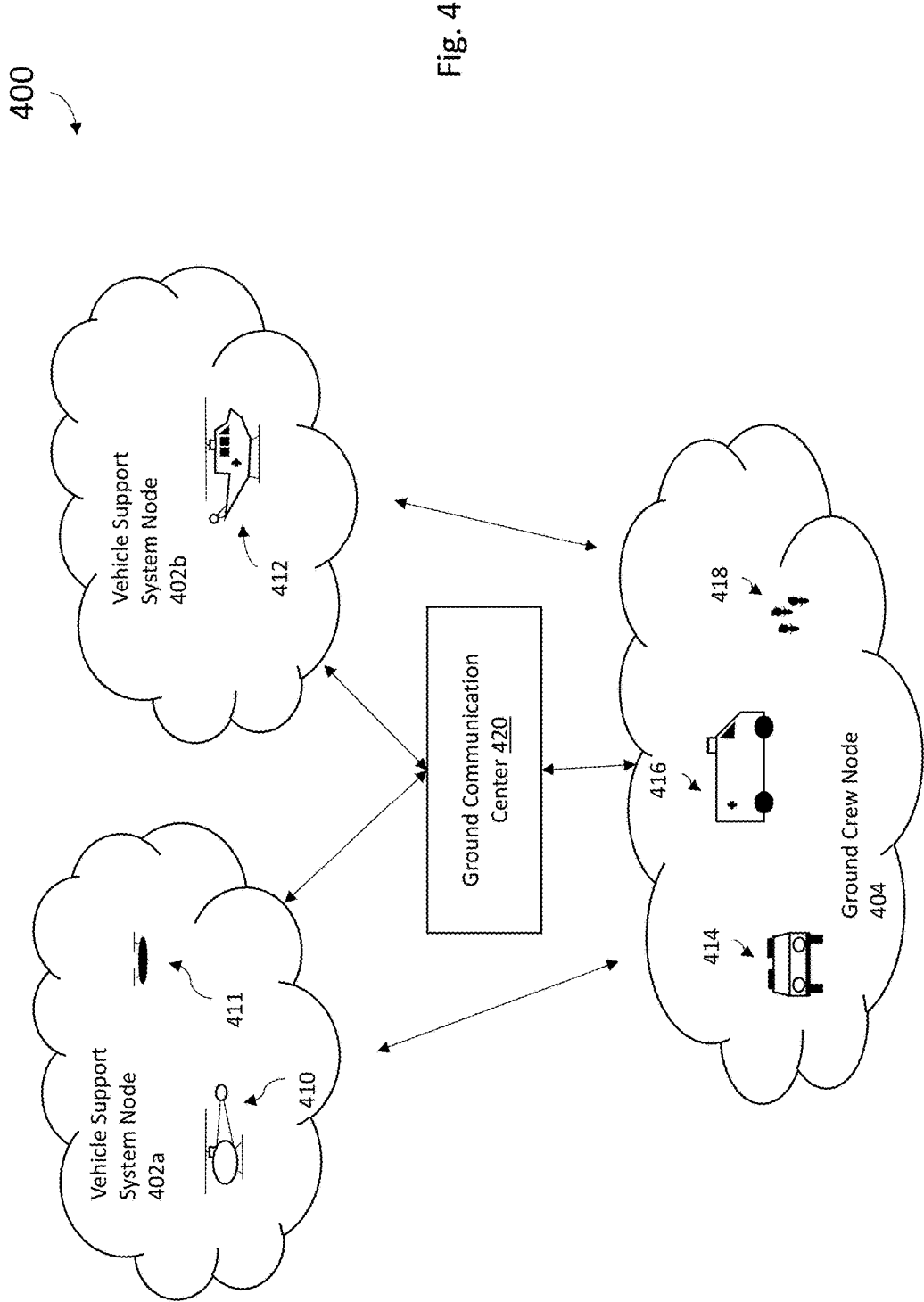

US 10,123,181 B1

SYSTEMS AND METHODS FOR COLLABORATIVE VEHICLE MISSION OPERATIONS

BACKGROUND

A search and rescue mission is one example of a collaborative effort that often brings together diverse civic resources to form an ad-hoc team to accomplish a specific and well defined task. Such missions typically require the rapid deployment of ground teams that operate within the area of interest, along with the dispatch of support vehicles to convey intelligence to members of those ground teams. Such missions often involve time critical or emergency situations where there is little time for mission operators to prepare in advance of deploying resources. For example, in search and rescue missions, ground teams and support vehicles may be mobilized to leave their stations before they are even told the exact nature of the mission or the specific location to which they must travel. Once dispatched, communication between the ground teams and support vehicles permits coordination of mission roles and operational efforts. However mobile communications can be sporadic and limited in bandwidth, and composing detailed communications may require team members to turn their attention away from their current environment which may be both very dynamic and potentially dangerous. For these reasons and other disclosed herein, there is a need in the art for systems and methods for collaborative vehicle mission operations.

SUMMARY

The Embodiments of the present disclosure provide for systems and methods for collaborative vehicle mission operations and will be understood by reading and studying the following specification.

Systems and Methods for Collaborative Vehicle Mission Operations are provided. In one embodiment, a method to facilitate collaborative vehicle mission operations comprises: inputting a deployment position and a selected mission category into a mission crew personal computing device; wirelessly communicating the deployment position and the selected mission category to a support vehicle, the support vehicle comprising at least one mission sensor and a mission computer; receiving the deployment position at a navigation system onboard the support vehicle and navigating the support vehicle to the deployment position; configuring the operation of the mission sensor and mission computer as defined by a predefined mission profile stored onboard the support vehicle; preprocessing sensor measurements from the at least one mission sensor to extract a subset of data defined as relevant to the selected mission category based on the predefined mission profile; and transmitting the subset of data defined as relevant to the selected mission category to the mission crew personal computing device.

DRAWINGS

Embodiments of the present disclosure can be more easily understood and further advantages and uses thereof more readily apparent, when considered in view of the description of the preferred embodiments and the following figures in which:

FIG. 2 is a block diagram illustrating a system for collaborative vehicle mission operations of one embodiment of the present disclosure;

FIG. 3 is a flow chart illustrating a method for collaborative vehicle mission operations of one embodiment of the present disclosure;

FIG. 4 is a flow chart illustrating a method for collaborative vehicle mission operations of one embodiment of the present disclosure.

In accordance with common practice, the various described features are not drawn to scale but are drawn to emphasize features relevant to the present disclosure. Reference characters denote like elements throughout figures and text.

DETAILED DESCRIPTION

Figure 1:
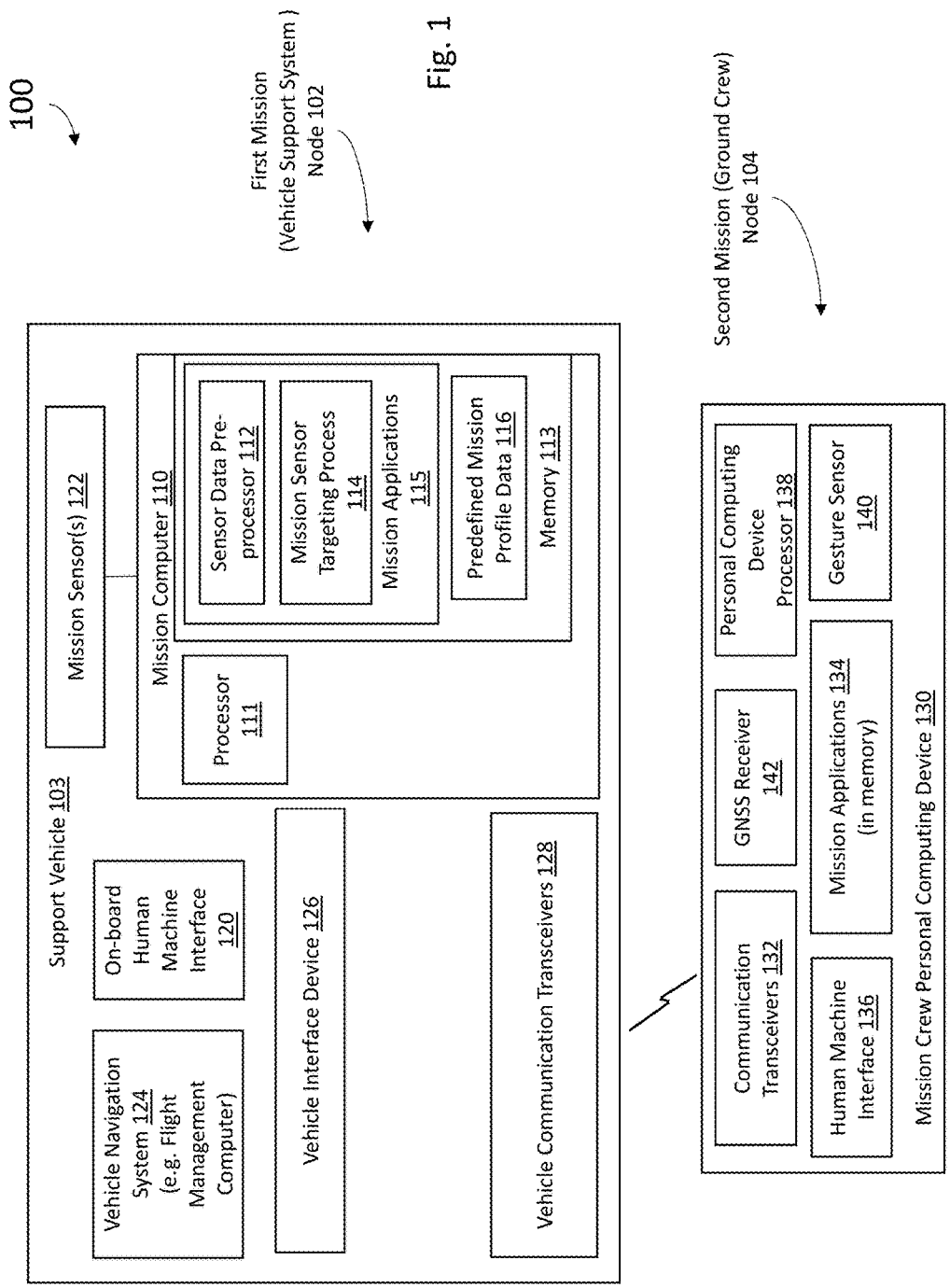
FIG. 1 is a block diagram illustrating a system for collaborative vehicle mission operations of one embodiment of the present disclosure.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure address problems associated with coordinating the flow of intelligence between mission resources. More specifically, embodiments of the present disclosure address problems associated with positioning and directing vehicle mounted sensors that provide intelligence in support of a ground based mission crew, allowing ground based mission coordinator to direct the mission sensors to gather data from either specific subject or regions of interest. Further embodiments optimize data transmission from the vehicle mounted sensors to the ground based mission personnel by preprocessing sensor data on the vehicle in order to extract the information that is most relevant to the ground based mission personal for the current mission. As discussed below, some embodiments preprocesses the mission sensor and other task related information with automated intelligence in the presence of specified events or timers. This preprocessing permits sharing of the most needed information after processing without sharing every piece of mission data for better efficiency. The system provides a method to downlink processed mission sensor information through data analytics rather than downlink every piece of data throughout the mission.

FIG. 1 is a system 100 for collaborative vehicle mission operations of one embodiment of the present disclosure. As shown in FIG. 1, system 100 comprises at least one vehicle support system node 102 (also referred to herein as a first mission node) that is in communication with a ground crew node 104 (also referred to herein as a second mission node). In this embodiment vehicle support system node 102 is embodiment within a single support vehicle 103. In other embodiments, vehicle support system node 102 may comprise a plurality of vehicles, each vehicle comprising the complement of the elements shown for the vehicle support system node 102. As the term is used herein, "vehicle" is intended to cover any type of means of transportation such as, but not limited to ground vehicles, aircraft, watercraft or spacecraft. In alternate embodiments, vehicle 103 may comprise a police helicopter, an emergency medical helicopter, an airplane, a fire and/or rescue truck or boat, an emergency medical system (EMS) vehicle such as an ambulance, a police vehicle, and so forth. The vehicles mentioned are intended as examples only, and not intended to limit the scope of vehicle which may embody a vehicle support system node 102 as described herein.

The second mission node 104 includes at least one mobile personal computing device 130 (also referred to herein as a mission crew personal computing device) that would be in the possession of at least one member of the mission crew who is operating at the site of the mission either on the ground or potentially onboard a vehicle. As such, the mobile personal computing device 130 is also referred to herein as a ground crew personal computing device 130. In some embodiments, multiple ground crew members may each possess an implementation of the ground crew personal computing device 130 described herein. It is contemplated that in at least some embodiments, the ground crew personal computing device 130 would comprise a wearable device worn by a ground crew member, or a handheld device (such as but not limited to a tablet) carried by the ground crew member. In one embodiment, at least one ground crew personal computing device 130 of the ground crew node 104 is controlled by a crew member designates as the mission operator (or mission coordinator) to direct placement and usage of mission team resources including vehicle mounted sensor resources.

The vehicle support system node 102 and ground crew node 104 wirelessly communicate with each other, and operate together to provide a solution to automate work flow and information flow. Wireless communication may be established using, for example, using any available communication infrastructure including cellular communications, satellite communications, and the like. Vehicle support system node 102 and ground crew node 104 also utilize intelligent preprocessing of collected information to optimize bandwidth utilization between the vehicle and ground crew system components. That is, as opposed to communicating all collected mission information to all mission team members, system 100 preprocesses data collected at each node using data analytics based on what information is relevant to a particular team member and by considering what information may be relevant for different categories of missions.

In some embodiments, the support vehicle 103 will comprise a mission computer 110 that is coupled to at least one mission sensor 122 and an on-board human machine interface (HMI) 120. The mission computer 110 receives sensor measurements from the at least one mission sensor 122 and sends configuration instructions to the mission sensor as further discussed below. The mission sensor 122 may include any form of intelligence gathering electronics to generate the sensor measurements such as, but not limited to, a visual spectrum camera, an infrared camera, radar or LIDAR sensors, acoustic sensors, radio frequency (RF) signal monitoring electronics, or any combination thereof. The particular complement of mission sensors 122 available on a specific support vehicle largely define the types of missions that vehicle is capable of supporting. A specific purpose support vehicle 103 may have a mission sensor 122 comprising only single sensor device, or a group of diverse sensor devices, that support specific mission categories. Other support vehicles 130 may be intended to function as multipurpose vehicles where some subset of the available mission sensors 122 components are used for some mission categories, and another subset for other mission categories.

In some embodiments, the on-board human machine interface (HMI) 120 may comprise vehicle mounted hardware such as a display screen (which may be a touchscreen), keyboard or keypad and/or a cursor control device and in some embodiments, audio-visual interfaces such as a microphone, speaker, and/or camera. In some embodiments, the on-board HMI 120 may instead, or in addition, comprise a personal computing device such as a mission electronic flight bag (EFB), a tablet computer or a handheld computer, which has a communication link with the mission computer 110 via a vehicle interface device 126. Other electronic components that may constitute part of node 102 include a vehicle navigation system 124 and one or more vehicle communication transceivers 128. The vehicle communication transceivers 128 include electronics for establishing wireless radio frequency communication links with elements of the ground crew node 104 utilize communications infrastructure such as cellular communications, satellite communications (SATCOM), High Frequency/Very High Frequency (HF/VHF) and the like, or combinations thereof. In some embodiments where the HMI 120 includes a personal computing device, the vehicle communication transceivers 128 may also process communications between the personal computing device and mission computer.

The particular capabilities and functions of the vehicle navigation system 124 will vary depending on the type of vehicles 130 with which node 102 is implemented. In one embodiment, vehicle navigating systems 124 may comprise a global navigation satellite system (GNSS) receiver and electronics, or other similar systems, that can determine the support vehicle 103's current position and communicate to the support vehicle 103's operator a route to the location to which the vehicle needs to travel to in order to provide support for the mission. In some embodiments, the vehicle navigating system 124 may plot a course (for example displayed on the HMI 120) for the vehicle operator to follow to reach the indicated destination. In still other embodiment, the vehicle navigating system 124 may comprise an autopilot or similar function that directly controls operation of the vehicle to bring it to the indicated mission location. For example, in one embodiment where support vehicle 103 comprises a helicopter, airplane, or other aircraft, the vehicle navigating systems 124 comprises the electronics that implement's aircraft's flight management computer. In such an embodiment, the vehicle navigating systems 124 receives mission location instructions originating from the ground crew node 104 and executes a course to that mission location upon confirmation of the instruction by pilot. In some embodiments, instructions to travel to the designated mission location may be communicated to the vehicle support system node 102 in the form of a controller-pilot datalink communication (CPDLC) clearance, for example.

The mission computer 110 comprises a processor 111 and a memory 113 for storing data and application code executed by the processor 111. As shown in FIG. 1, the mission computer 110 includes one or more mission applications 115 (executed by the processor 111 to implement functions of the mission computer 110 discussed herein) which may be stored in the memory 113. Mission applications 115 include, but are not limited to, at least a sensor data pre-processor 112 which accesses predefined mission profile data 116. The mission applications 115 may also include at least one mission sensor targeting process 114.

Referring now to the second mission node 104 of system 100, in one embodiment a ground crew personal computing device 130 will comprise a processor 138 configured to execute one or more mission applications 134 stored in a memory 135. The device 130 further comprises an HMI 136, at least one communication transceiver 132, and a gesture sensor 140. In one embodiment, the HMI 136 includes a touch screen display which may display textual and graphical information to the device user, and accept input from the user. The HMI 136 may also comprise at least one speaker, microphone, and a camera for conveying audio-visual information to and from the user. The gesture sensor 140 may comprise one or more inertial devices such as microelectromechanical sensor (MEMS) accelerometers and/or gyroscopes which translate user gestures or motions into inertial measurements. As discussed below, these inertial measurements may be provided to the processor 138 and/or mission application 134, where were pre-defined user gestures or movements detected by the gesture sensors 140 are translated into specific commands or directions from the user.

The mission applications 134 utilize specialized logic to allow the ground crew mission coordinator to supply information to the support vehicle operator in order to configure and/or direct the vehicle mounted mission sensor(s) 122 to collect intelligence relevant to the current mission. As contemplated under the embodiments disclosed herein, the mission controller is a mission team ground crew member in possession of a mobile personal computer device 130 within the ground crew node 104. By executing one or more of the mission applications 134, the mission coordinator may utilize device 130 to deploy support vehicle 103 (or a plurality of support vehicles 130) and direct them to specified deployment positions, as well as direct the operation of mission sensors 122.

FIG. 2 is a flow chart illustrating one such method 200 for deploying a support vehicle to a deployment position through a ground crew personal computing device 130 within the ground crew node 104. It should be understood that method 200 may be implemented in conjunction with any of the various embodiments and implementations described in this disclosure above or below. As such, elements of method 200 may be used in conjunction with, in combination with, or substituted for elements of those embodiments. Further, the functions, structures and other description of elements for such embodiments described herein may apply to like named elements of method 200 and vice versa.

Method 200 begins with the mission initiation at 210, where the mission coordinator operates a ground crew personal computer device 130 within the ground crew node 104 to initiate a mission. In one embodiment, a mission application 134 is executed prompting the user (i.e., the mission coordinator) to indicate the nature of the mission, which may include a mission category or other general mission information. In one embodiment, as a function of the selected mission category, one or more support vehicles 130 are mobilized. In one embodiment, the mobile personal computer device 130 communicates directly with the one or more ground support vehicles 130 that are to be mobilized. In another embodiment, the mobile personal computer device 130 communicates the mission category with a support vehicle dispatch center, and the dispatch center selects and deploys an appropriate support vehicle 103 for the mission category. The deployed support vehicle 103 may then either join (if already established) or establish (if not previously established) the support vehicle system node 104.

Method 200 proceeds to 220 with communicating a deployment position to the support vehicle 103 from the ground crew personal computer device 130. In one embodiment, the mission application 134 may determine the mission location based on the location of the ground crew member operating the, the mobile personal computer device 130. For example, the mission application 134 may obtain a current position from GNSS 142 and communicate that location information to the support vehicle 103. In other embodiments, a mission location may be communicated by the mission coordinator in other ways. For example, the mission coordinator may utilize a predefined gesture detected by the gesture sensor 140. Alternately, the mission coordinator may utilize a voice trigger or touch trigger that is input into the HMI 136 to indicate either a current position of the ground crew, or to input some alternate location the mission coordinator needs the support vehicle 103 to deploy to. In that case the HMI 136 may comprise a microphone and/or tactile input sensor (such as a touch screen). For example, the mission coordinator may speak an address into device 130 along with a command that instructs the support vehicle 103 to move to that address. Alternately, the mission coordinator may capture an image of a street sign along with a command that instructs the support vehicle 103 to move to that address. In still other embodiments, the mission application 134 may display a map onto the HMI 136, and the mission coordinator may touch a position on that map to indicate where the support vehicle should move to.

It should be appreciated that the navigation system 124 in some support vehicles may require destination locations to be entered in the form of coordinates (e.g., latitude and longitude) in order to plan a trajectory or route to the mission scene. To accommodate such situations, in some embodiments, the mission applications 134 may translate the entered voice data or captured visual images, or touch points indicated on a displayed map and captured by HMI 136 into location coordinate data. This location coordinate data (which for example may be translated into a WSG-84 compliant format) are in turn transmitted by the transceivers 132 of device of device 130 to the transceivers 128 of the vehicle support system node 102. The location information, translate into the location coordinate data and transmitted to the node 102, is thus transmitted in a form compatible for immediate input into the vehicle navigation system 124.

Method 200 then proceeds 230, where at the vehicle support system node 104, the mission deployment position coordinates are automatically received by and loaded into the vehicle navigation system 124. Once this occurs, the method 200 proceeds to 240 where the vehicle operator is presented with the opportunity to confirm the instructions via a prompt displayed on the on-board HMI 120. That is, the location coordinate data is automatically loaded into the vehicle navigation system 124, but the prompt allows the vehicle operator to indicate their approval for the support vehicle 103 to travel to that location. For example, if the location coordinate data is recognized by the vehicle operator as being invalid (e.g., location coordinate data that would direct a truck to drive into the middle of a very deep lake) or a destination that cannot be reach for other technical reasons (e.g., the vehicle has insufficient fuel to reach and/or return from the destination) then the vehicle operator may decline the instruction. If the vehicle operator does not confirm the mission instruction, the method proceeds to 250 where a rejection messages is communicated back to the device 130 so that the mission coordinator can either select an alternate location to position the support vehicle 103 or select another support vehicle 103 to perform for the intended task. When the support vehicle operator does confirm the mission instructions, the method 200 proceeds to 260 where a mission entry is added to the mission planning process executed by the mission computer 110. In one embodiment, the vehicle navigation system 124 also plots an appropriate course and/or pilots the support vehicle 103 to the designated position.

In the same matter as described above, voice triggers, gestures, or other inputs provided by the mission coordinator into the device 130 may be utilized to configure and/or direct the one or more mounted mission sensors 122 in order to collect intelligence relevant to the current mission and send that information back to the mission coordinator (and/or other members in the ground crew node 104) for display on device 130.

In one embodiment, the mission coordinator may utilize the mission application 134 to communicate to the mission sensor targeting process 114 to select one or more of the mission sensors 122 aboard the support vehicle 103 and specify a target that the mission sensor 122 should lock onto in order to collect intelligence about the target. Depending on the mission, the target may comprise, for example, a general geographic region, building, a person or group of people, a vehicle. The mission application 134 also prompts the mission coordinator to specify the target to which the mission sensor 122 should be directed. This information may be input into the device 130 in any number of ways, in the same manner that mission location information was captured. For example, the mission coordinator may utilize a predefined gesture detected by the gesture sensor 140. Alternately, the mission coordinator may utilize a voice trigger or touch trigger that is input into the HMI 136 to indicate either a current position of the ground crew, or to input some alternate location the mission coordinator needs the mission sensor 122 to target. For example, the mission coordinator may speak an address into device 130 along with a command that instructs the support vehicle 103 to direct the mission sensor 122 to that target. Alternately, the mission coordinator may capture an image of a street sign or landmark along with a command that instructs the support vehicle 103 direct the mission sensor 122 to that target. In still other embodiments, the mission application 134 may display a map onto the HMI 136, and the mission coordinator may touch a position on that map to indicate where the support vehicle should direct the mission sensor 122.

In this way, embodiments of the present disclosure place the support vehicle 103 mounted mission sensor 122 resources at the disposal of the mission coordinator to collect data regarding a mission target or search region. For example, in the case of a search and rescue mission, the mission coordinator may input into the device 130 an area suspected to contain wreckage or accident victims and request access to a specific mission sensor 110 to obtain a visual image surveillance stream of that area. Such intelligence may reveal conditions at the scene, the number of potential victims, and their relative locations. Similarly, the mission coordinator may utilize voice triggers, gestures, or other user inputs into the device 130 to direct an IR imaging mission sensor 110 to that same area to detect, for example, the presence of flames, people, or other heat sources at the scene. In a mission category that involves a police action, the mission coordinator may operate the mission sensor targeting process 114 to direct the mission sensor 122 to track, for example, the movements of a suspect vehicle. In that case, the mission sensor 122 may be configured to capture information regarding suspect and/or suspect vehicle. For example, the mission sensor 122 may be used to determine if the suspect is armed. Regarding a vehicle, information regarding vehicle direction, speed, color, make, license tag information, and the like may also be captured. Moreover, the mission application 134 may be instructed by the mission coordinator to have the mission sensor targeting process 114 dynamically update the mission sensor 112 to direct it to another target, or to have the mission sensor targeting process 114 activate/deactivate a subset of a plurality of available mission sensors 112 aboard vehicle 130 to keep the mission sensor 112 on the target and providing relevant information to ground crew members. In this was, if mission objectives evolve (for example, a mission shifts from a search and rescue mission to a recovery mission, or a surveillance mission evolves into an apprehension mission) the mission coordinator can reconfigure the mission sensor 122 based on the new mission objectives.

As mentioned above, the support vehicle system node 104 includes a sensor data preprocessor 112 which may be executed by the mission computer 110. The mission sensor 122 may collect a large set of intelligence, often in excess of that information which is actually relevant to the mission ground crew. However, there is no need to transmit the entirety of the data set collected by the mission sensor 122 from the support vehicle 103 to the device 130. In some embodiments, the sensor data preprocessor 112 inputs the data obtained by a mission sensor 122, and analyzes that data to extract just that information relevant to the current mission. In some embodiments, sensor data preprocessor 112 implements automated intelligence in the presence of specified events or timers defined as relevant for the current mission in the predefined mission profile data 116.

For example, the sensor data preprocessor 112 inputs a video stream from the mission sensor 122 and extracts images relevant to mission parameters, or extracts details pertaining to the target and communicates just those details to the one or more devices 130 in the ground crew node 104. In doing so, wireless datalink bandwidth is conserved by avoiding the transmission of data not relevant to the current mission. The data collected by the mission sensor 122 is processed locally before it is transmitted.

What information is relevant for a given mission is largely a function of the mission category and therefore can be different from one mission to the next. For this reason, the mission computer 110 aboard the support vehicle 103 is responsive to the mission category identified by the mission coordinator via the mission application 134 on device 130. In one embodiment, predefined mission profile data 116 stored in the mission computer 110 and the sensor data preprocessor 112 can access the predefined mission profiles stored in the predefined mission profile data 116. The predefined mission profile data 116 may include a multitude of different mission profiles each associated with a different mission category and each defining what data collected from each mission sensor 122 is relevant for each of the defined mission categories. That is, each of the predefined mission profiles stored in 116 delineate what type of information should be extracted from the full data set generated by a particular mission sensor 122 for a particular predefined mission category.

For example, in one embodiment a mission coordinator may use the mission application to set the mission category as a first "general search and rescue" mission category type to respond to an event where a group of hikers fell of the side of a cliff in a remote area. That mission category is communicated to the Sensor Data Pre-processor 112 which then pulls from the predefined mission profiles 116 a predefined mission profile associated with the "general search and rescue" mission category and configures itself to extract data from the data generated by the mission sensors 122 as indicated by that predefined mission profile. In this example, the Sensor Data Pre-processor 112 may extract the entirety of an image stream from a mission sensor 122 comprising a visual spectrum camera and send that to the device 130. At the same time, for data from an IR spectrum camera, the Sensor Data Pre-processor 112 identifies regions in the image data having temperatures corresponding to a range of human body temperatures, and based on the number of such regions further reduces that information into "Estimated Potential Victims" number which is communicated to the device 130 and displayed on the HMI 136. That is, instead of transmitting an entire infrared image stream over the air and displaying it on the device 130 for the mission coordinator to then interpret, the IR image is interpreted on the support vehicle 103, so that only a simple scalar value needs to be transmitted to the device 130, thus conserving bandwidth while efficiently providing the mission coordinator with exactly the relevant data they need.

Under a different rescue mission scenario, such as a "fire-rescue" mission, the Sensor Data Pre-processor 112 instead pulls from the predefined mission profiles 116 a predefined mission profile associated with the "fire-rescue" mission category and configures itself to extract data from the data generated by the mission sensors 122 as indicated by that predefined mission profile. In that case, the Sensor Data Pre-processor 112 configures itself to identify regions in the image data having temperatures corresponding to active flames or "hot-spots" and based on the number of such regions further reduces that information into "Estimated Hot-Spot" number which is communicated to the device 130 and displayed on the HMI 136. Alternatively, the Sensor Data Pre-processor 112 may be configured to identify explosions extracted from either the visual or IR image sensor streams, and reduce that information into a warning message conveyed to the device 130 and displayed on the HMI 136.

An entirely different mission scenario may be a vehicle pursuit mission associated with a police action. In such an embodiment, the mission coordinator may user the mission application 134 to set the mission category as a "vehicle pursuit" mission category type. That mission category is communicated to the Sensor Data Pre-processor 112 which then pulls from the predefined mission profiles 116 a predefined mission profile associated with the "vehicle pursuit" mission category and configures itself to extract data from the data generated by the mission sensors 122 as indicated by that predefined mission profile. In this example, the Sensor Data Pre-processor 112 may, based on the predefined mission profile, extract the from a visual spectrum camera identifying information about the subject vehicle, such as color, speed, direction of travel, or any other observable identifying detail such as license tag information. That particular predefined mission profile may also configure the mission computer to track the vehicle using a radar mission sensor, and have Sensor Data Pre-processor 112 extract from captured radar data a relative position of the vehicle. Again, instead of transmitting all the data captured by the mission sensors over the air and displaying it on the device 130 for the mission coordinator to interpret, the intelligence captured by the mission sensors 122 are prepressed in a manner defined by the predefined mission profile, conserving bandwidth while efficiently providing the mission coordinator with exactly the relevant data they need.

It should also be appreciated that there will be times a mission coordinator needs to re-categorize a current mission, such as when a "search and rescue" mission evolves into a "search and recovery" or "accident investigation" mission. In such cases, the mission coordinator may simply enter the new mission citatory into the device 130 and the Sensor Data Pre-processor 112 will pull the appropriate predefined mission profile and configure itself accordingly.

To summarize the above, FIG. 3 provides a flow chart illustrating a method 300 for efficiently communicating mission intelligence based on predefined mission categories. It should be understood that method 300 may be implemented in conjunction with any of the various embodiments and implementations described in this disclosure above or below. As such, elements of method 300 may be used in conjunction with, in combination with, or substituted for elements of those embodiments. Further, the functions, structures and other description of elements for such embodiments described herein may apply to like named elements of method 300 and vice versa. The mission begins at 310 where the mission coordinator defines the mission category via their device 130 and the mission computer 122 aboard the support vehicle 103 receives the mission category. At 320, the Sensor Data Pre-processor 112 will pull the appropriate predefined mission profile from memory and configure itself accordingly. The method the proceeds to 330 where the Sensor Data Pre-processor 112 extracts the most relevant data collected by the mission sensor based on what data the predefined mission profile indicates is most relevant for the selected mission category. The method then proceeds to 340 where the support vehicle system node 104 sends that most relevant data collected by the mission sensor to the ground crew node 104.

FIG. 4 at 400 illustrates one such network configuration of a system 400 implementation of system 100 where a first support vehicle system node 402a may comprises vehicles such as a police helicopter 410 and an unmanned aerial vehicle 411 and a second support vehicle system node 402b comprises an emergency medical helicopter 412. Further, a ground crew node 404 comprises a police car 414, an EMS Vehicle (i.e., an ambulance) 416 and a one or more policemen on foot 418. It should be understood that system 400 may be implemented in conjunction with any of the various embodiments and implementations described in this disclosure above or below. As such, elements of system 400 may be used in conjunction with, in combination with, or substituted for elements of those embodiments. Further, the functions, structures and other description of elements for such embodiments described herein may apply to like named elements of system 400 and vice versa.

In some embodiments, one or more support vehicle system nodes 402a and/or 402b together with one or more ground crew nodes 404 may be between themselves in a peer-to-peer fashion to define a virtual server which supports the transport of data between the various nodes. In other embodiments, in addition to one or more support vehicle system nodes 404 together with one or more ground crew node 404, system 400 may further include additional nodes comprising, for example, a data service center or ground command center (shown at 420). For example, ground command center may provide information to the mission coordinator's device 130 as to what support vehicles, or other resources, are currently available to support a mission. In this embodiment, communications between these various nodes may be coordinated through the data service and/or ground communications center 420. Within the ground crew node 404, one member in position of a ground crew personal computing device 130 may be designated as the mission coordinator, but all functionality of that device 130 may be resident in other devices in possession of any crew member in any so that if the mission coordinator's ground crew personal device is damaged or fails, the mission coordinator functionality may be activated in another ground crew personal device 130.

EXAMPLE EMBODIMENTS

Example 1 includes a system for collaborative vehicle mission operations, the system comprising: a first mission node residing on at least one support vehicle, the at least one first mission node including: a navigation system; at least one on-board communications transceiver comprising electronics configured to establishing wireless radio frequency communication links; at least one mission sensor; a mission computer coupled to the mission sensor, wherein the mission computer receives sensor measurements from the at least one mission sensor and sends configuration instructions to the mission sensor, the mission computer comprising a sensor data preprocessor, and predefined mission profile data; and an on-board human machine interface in communication with the navigation system and the mission computer; at least one second mission node comprising at least one mission crew personal computing device, the at least one mission crew personal computing device including: a personal computing device processor executing at least one personal computing device mission application; a human machine interface coupled to the personal computing device processor; and at least one communications transceiver comprising electronics configured to establishing at least a first wireless radio frequency communication link with the at least one on-board communications transceiver; wherein, in response to a selection entered on the human machine interface by a user, the at least one personal computing device mission application communicates to the mission computer a selected mission category, wherein based on the selected mission category, the mission computer reads a predefined mission profile from the predefined mission profile data and configures the sensor data preprocessor as indicated by the predefined mission profile; and wherein, in response to a position entered on the human machine interface by the user, the at least one personal computing device mission application communicates to the navigation system a deployment position for the support vehicle, wherein the navigation system generates a route to the deployment position.

Example 2 includes the system of example 1, wherein the predefined mission profile data comprises a plurality of predefined mission profiles each associated with a defined mission category, wherein each of the plurality of predefined mission profiles define what data is relevant to collect for each of the defined mission categories.

Example 3 includes the system of any of examples 1-2, wherein the sensor data preprocessor extracts a subset of data defined as relevant to the selected mission category based on the predefined mission profile and the mission computer transmits the subset of data defined as relevant to the selected mission category to the at least one second mission node.

Example 4 includes the system of any of examples 1-3, wherein the sensor data preprocessor implements automated intelligence in the presence of specified events or timers defined as relevant for the selected mission category in the predefined mission profile data.

Example 5 includes the system of any of examples 1-4, wherein the mission computer further comprises a mission sensor targeting process; wherein, in response to a position entered on the human machine interface of the mission crew personal computing device by the user, the at least one personal computing device mission application communicates to the mission sensor targeting process a target position for the mission computer to direct the mission sensor to target.

Example 6 includes the system of any of examples 1-5, wherein the on-board human machine interface comprises a personal computing device, wherein at least part of the sensor data preprocessor is executed on the personal computing device.

Example 7 includes the system of any of examples 1-6, wherein the navigation system comprises an autopilot that autonomously navigates the support vehicle to the deployment position.

Example 8 includes the system of example 7, wherein the navigation system prompts a support vehicle operator to confirm the deployment position via the human machine interface.

Example 9 includes the system of any of examples 1-8, wherein the support vehicle comprises an aircraft, a ground vehicle, a watercraft, or a spacecraft.

Example 10 includes the system of any of examples 1-9, wherein the mission crew personal computing device comprises a gesture sensor; wherein the at least one personal computing device mission application translates pre-defined user gestures into specific commands or directions from the user.

Example 10 includes the system of any of examples 1-10, wherein the mission crew personal computing device comprises at least one of a microphone or a tactile input sensor.

Example 12 includes the system of any of examples 1-11, wherein the at least one second mission node comprises a plurality of mission crew personal computing devices.

Example 13 includes the system of any of examples 1-12, wherein the first mission node and the at least one second mission node communicate via peer-to-peer datalinks.

Example 14 includes the system of any of examples 1-13, further comprising at least one of a data service center or a ground command center in communication with at least one of the first mission node or the at least one second mission node.

Example 15 includes the system of any of examples 1-14, wherein, in response to the selection entered on the human machine interface by the user, the at least one personal computing device mission application communicates the selected mission category to a support vehicle dispatch center, wherein the support vehicle dispatch center selects and deploys the support vehicle based on the selected mission category.

Example 16 includes the system of any of examples 1-15, wherein the at least one mission sensor includes at least one of: but not limited to, a visual spectrum camera, an infrared camera, a radar sensor, a LIDAR sensor, an acoustic sensor, or a radio frequency (RF) signal monitoring sensor.

Example 17 includes a method to facilitate collaborative vehicle mission operations, the method comprising: inputting a deployment position and a selected mission category into a mission crew personal computing device; wirelessly communicating the deployment position and the selected mission category to a support vehicle, the support vehicle comprising at least one mission sensor and a mission computer; receiving the deployment position at a navigation system onboard the support vehicle and navigating the support vehicle to the deployment position; configuring the operation of the mission sensor and mission computer as defined by a predefined mission profile stored onboard the support vehicle; preprocessing sensor measurements from the at least one mission sensor to extract a subset of data defined as relevant to the selected mission category based on the predefined mission profile; and transmitting the subset of data defined as relevant to the selected mission category to the mission crew personal computing device.

Example 18 includes the method of example 17, further comprising: reading the predefined mission profile from predefined mission profile data stored in an onboard memory, wherein the predefined mission profile data comprises a plurality of predefined mission profiles each associated with a defined mission category, wherein each of the plurality of predefined mission profiles define what data is relevant to collect for each of the defined mission categories.

Example 19 includes the method of any of examples 17-18, wherein the mission computer further comprises a mission sensor targeting process; wherein, in response to a position entered on a human machine interface of the mission crew personal computing device, the mission sensor targeting process directs to mission sensor to a target position.

Example 20 includes the method of any of examples 17-19, wherein the mission crew personal computing device comprises a gesture sensor; wherein the at least one personal computing device mission application translates pre-defined user gestures into specific commands or directions from the user.

In various alternative embodiments, system elements, method steps, or examples described throughout this disclosure (such as the Mission Computer, Sensor Data Pre-Processor, Missions Sensor Targeting Process, Vehicle Navigation system, on-board HMI, ground crew personal computing device/mission crew personal computing device and HMI, data service center, ground command center and/or sub-parts of any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A system for collaborative vehicle mission operations, the system comprising:
   a first mission node residing on at least one support vehicle, the first mission node including:
   a navigation system;
   at least one on-board communications transceiver comprising electronics configured to establishing wireless radio frequency communication links;
   at least one mission sensor that outputs mission sensor data, wherein the at least one mission sensor comprises a vehicle mounted mission sensor;
   a mission computer coupled to the mission sensor, wherein the mission computer receives sensor measurements from the at least one mission sensor and sends configuration instructions to the mission sensor, the mission computer comprising a sensor data preprocessor that receives the mission sensor data from the vehicle mounted mission sensor, and predefined mission profile data; and
   an on-board human machine interface in communication with the navigation system and the mission computer;
   at least one second mission node comprising at least one mission crew personal computing device configured to be mobile, the at least one mission crew personal computing device including:
   a personal computing device processor executing at least one personal computing device mission application;
   a human machine interface coupled to the personal computing device processor; and
   at least one communications transceiver comprising electronics configured to establishing at least a first wireless radio frequency communication link with the at least one on-board communications transceiver;
   wherein, in response to a selection entered on the human machine interface by a user, the at least one personal computing device mission application communicates to the mission computer a selected mission category, wherein based on the selected mission category, the mission computer reads a predefined mission profile from the predefined mission profile data and configures the sensor data preprocessor to analyze and filter the mission sensor data from the vehicle mounted mission sensor as indicated by the predefined mission profile; and
   wherein, in response to a position entered on the human machine interface by the user, the at least one personal computing device mission application communicates to the navigation system a deployment position for the support vehicle, wherein the navigation system generates a route to the deployment position;
   wherein the sensor data preprocessor extracts a subset of the mission sensor data from the vehicle mounted mission sensor defined as relevant to the selected mission category based on the predefined mission profile and the mission computer transmits the subset of data defined as relevant to the selected mission category to the at least one second mission node;
   wherein the mission crew personal computing device comprises a gesture sensor;
   wherein the at least one personal computing device mission application translates pre-defined user gestures into specific commands or directions from the user; and
   wherein the first mission node and the at least one second mission node communicate via peer-to-peer datalinks.

2. The system of claim 1, wherein the predefined mission profile data comprises a plurality of predefined mission profiles each associated with a defined mission category, wherein each of the plurality of predefined mission profiles define what data is relevant to collect for each of the defined mission categories.

3. The system of claim 1, wherein the sensor data preprocessor implements automated intelligence in the presence of specified events or timers defined as relevant for the selected mission category in the predefined mission profile data.

4. The system of claim 1, wherein the mission computer further comprises a mission sensor targeting process;
wherein, in response to a position entered on the human machine interface of the mission crew personal computing device by the user, the at least one personal computing device mission application communicates to the mission sensor targeting process a target position for the mission computer to direct the mission sensor to target.

5. The system of claim 1, wherein the on-board human machine interface comprises a personal computing device, wherein at least part of the sensor data preprocessor is executed on the personal computing device.

6. The system of claim 1, wherein the navigation system comprises an autopilot that autonomously navigates the support vehicle to the deployment position.

7. The system of claim 6, wherein the navigation system prompts a support vehicle operator to confirm the deployment position via the human machine interface.

8. The system of claim 1, wherein the support vehicle comprises an aircraft, a ground vehicle, a watercraft, or a spacecraft.

9. The system of claim 1, wherein the mission crew personal computing device comprises at least one of a microphone or a tactile input sensor.

10. The system of claim 1, wherein the at least one second mission node comprises a plurality of mission crew personal computing devices.

11. The system of claim 1, further comprising at least one of a data service center or a ground command center in communication with at least one of the first mission node or the at least one second mission node.

12. The system of claim 1, wherein, in response to the selection entered on the human machine interface by the user, the at least one personal computing device mission application communicates the selected mission category to a support vehicle dispatch center, wherein the support vehicle dispatch center selects and deploys the support vehicle based on the selected mission category.

13. The system of claim 1, wherein the at least one mission sensor includes at least one of: but not limited to, a visual spectrum camera, an infrared camera, a radar sensor, a LIDAR sensor, an acoustic sensor, or a radio frequency (RF) signal monitoring sensor.

* * * * *